(12) United States Patent
Kobayashi et al.

(10) Patent No.: US 8,590,495 B2
(45) Date of Patent: Nov. 26, 2013

(54) CONTROL DEVICE FOR INTERNAL COMBUSTION ENGINE

(75) Inventors: Hideo Kobayashi, Mishima (JP); Kunihiko Hayashi, Odawara (JP); Akihito Hosoi, Susono (JP); Masahide Ishikawa, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/581,690

(22) PCT Filed: Mar. 5, 2010

(86) PCT No.: PCT/JP2010/053674
§ 371 (c)(1),
(2), (4) Date: Aug. 29, 2012

(87) PCT Pub. No.: WO2011/108117
PCT Pub. Date: Sep. 9, 2011

(65) Prior Publication Data
US 2012/0318213 A1  Dec. 20, 2012

(51) Int. Cl.
*F01P 7/16* (2006.01)
(52) U.S. Cl.
USPC .................. 123/41.02; 123/41.44; 123/179.4; 180/65.21; 477/13
(58) Field of Classification Search
USPC ......... 123/41.44, 41.15, 41.02, 198 C, 179.4; 192/84.1, 3.56, 48.2; 180/65.21; 701/113; 477/8, 13, 179–181
See application file for complete search history.

(56) References Cited

U.S. PATENT DOCUMENTS

| | | | | |
|---|---|---|---|---|
| 4,079,715 A * | 3/1978 | Masaki et al. | ............. | 123/41.05 |
| 6,453,865 B2 * | 9/2002 | Hirose et al. | ............... | 123/179.4 |
| 6,793,059 B2 * | 9/2004 | Okada et al. | ................. | 192/84.1 |
| 6,997,156 B2 * | 2/2006 | Tanei et al. | ................ | 123/179.3 |
| 2008/0179119 A1 * | 7/2008 | Grenn et al. | ................. | 180/65.2 |

FOREIGN PATENT DOCUMENTS

| | | |
|---|---|---|
| JP | 2000-90537 A | 3/2000 |
| JP | 2002-161748 A | 6/2002 |
| JP | 2007-285268 A | 11/2007 |
| JP | 2008-169750 A | 7/2008 |
| JP | 2008-274909 A | 11/2008 |
| JP | 2010-31701 A | 2/2010 |

* cited by examiner

*Primary Examiner* — Hung Q Nguyen
(74) *Attorney, Agent, or Firm* — Sughrue Mion, PLLC

(57) ABSTRACT

In a control device 1 for a clutch unit 20 for transmitting rotation of a crankshaft 18 of an engine 100 to a water pump 2 for circulating cooling water within the engine 100, it is determined that whether engagement or disengagement of the clutch unit 20 when a request to start the engine 100 is made, and the clutch unit 20 is caused to be in an engagement state based on a determination result before cranking of the engine 100 starts.

8 Claims, 5 Drawing Sheets

CONTROL DEVICE FOR INTERNAL COMBUSTION ENGINE

CROSS REFERENCE TO RELATED APPLICATIONS

This application is a National Stage of International Application No. PCT/JP2010/053674, filed on Mar. 5, 2010 the contents of all of which are incorporated herein by reference in their entirety.

TECHNICAL FIELD

The present invention relates to a control device for a clutch for transmitting rotation of a crankshaft of an engine to a water pump for circulating cooling water within the engine.

BACKGROUND ART

There is known an engine provided with a variable water pump which can voluntarily drive and stop a water pump. In such an engine, the circulation of cooling water is stopped in warming up the engine, thereby warming up the engine early, and thereby improving fuel consumption and emission. Although an electric water pump has been already employed as the variable water pump, the electric water pump has a high cost, and requires high power to need a battery with a high capacity.

In addition to the electric water pump, there is known another variable water pump of an electromagnetic clutch type. In such another variable water pump, an electromagnetic clutch engages or disengages a drive shaft of the engine with a drive shaft of the water pump so as to vary an amount of the cooling water pressure-fed. This variable water pump of the electromagnetic clutch type has a cost lower than that of the electric water pump, and has attracted attention as an alternative technology of the electric water pump.

Patent Document 1 describes an improved variable water pump of the electromagnetic clutch type. In the water pump described in Patent Document 1, a coil of the electromagnetic clutch is energized in a lower load state to reduce a cooling water amount supplied by the water pump.

PRIOR ART DOCUMENT

Patent Document

[Patent Document 1] Japanese Patent Application Publication No. 2007-285268

SUMMARY OF THE INVENTION

Problems to be Solved by the Invention

However, in the variable water pump of the electromagnetic clutch type, the engagement or disengagement of the clutch increases the abrasion of a clutch board. Thus, a drive state where the engagement and the disengagement are alternately repeated frequently is continued, so that the clutch might slide not to perform the engagement thereof. In particular, in a vehicle performing eco-run, the engine is started or stopped frequently. In a case where the engagement and disengagement of the clutch are performed in response to the start and the stop of the engine, the abrasion of the clutch might increase, so that the engagement of the clutch might not be performed. When the engagement of the clutch cannot be performed in such a way, the water pump cannot be driven. Therefore, this might lead to overheating of the engine.

It is therefore an object of the present invention to provide an engine provided with a water pump driven by a drive force which is transmitted thereto by engagement of a clutch, thereby suppressing abrasion of the clutch caused by engagement or disengagement thereof and maintaining the clutch in a high reliable state.

Means for Solving the Problems

In order to solve the problem, according to an aspect of the present invention, a control device for a clutch for transmitting rotation of a crankshaft of an engine to a water pump for circulating cooling water within the engine, the control device includes: a determining unit that determines whether engagement or disengagement of the clutch, when a request to start the engine is made; and a control unit that controls an engagement state of the clutch based on a determination result of the determining unit, before cranking of the engine starts. With such a configuration, the engagement or the disengagement is performed before the crankshaft starts rotating, thereby suppressing the abrasion of the clutch and maintaining the clutch in a high reliable state.

In such a control device for the clutch, the determining unit may determine whether the engagement or the disengagement of the clutch based on a warming-up state of the engine at a time of making the request to start the engine. Thus, when the engine has already finished being warmed up, the cranking is performed by the engagement of the clutch, thereby suppressing the abrasion thereof.

Such a control device for the clutch may include an estimating unit that estimates an abrasion state of a clutch board of the clutch, wherein the disengagement of the clutch may be prohibited, when the estimating unit determines an abrasion amount of the clutch board is equal to or larger than a predetermined value. With such a configuration, the engagement of the clutch is maintained, thereby suppressing unnecessary abrasion caused by alternately repeating the engagement and the disengagement of the clutch.

In such a control device for the clutch including the estimating unit, the disengagement of the clutch may be configured to be prohibited, when the engine is warmed up. With such a configuration, the engagement of the clutch can be avoided from being performed while the crankshaft rotating after the cranking. This can suppresses the abrasion of the clutch.

In such a control device for the clutch including the estimating unit, the estimating unit may estimate the abrasion amount of the clutch based on the number of engagements of the clutch. Therefore, an increase in the abrasion amount of the clutch can be estimated as the number of engagements increases.

Such a control device for the clutch may include an estimating unit that estimates an abrasion state of a clutch board of the clutch; and a system that automatically stops and automatically starts the engine, wherein automatic stop and automatic start of the engine by the system may be prohibited, when the estimating unit determines that the abrasion amount of the clutch board is equal to or larger than a predetermined value. Such a configuration can suppress the engine from stopping often, thereby reducing the alternate repeating of the engagement or disengagement of the clutch and suppressing the abrasion thereof.

Such a control device for the clutch may include a system that automatically stops and automatically starts the engine; and a determining unit that determines whether automatic stop and automatic start of the engine is permitted or prohibited based on a voltage state of a battery. With such a configuration, the disengagement of the clutch is performed when power shortage occurs, thereby suppressing the abrasion of the clutch.

Such a control device for the clutch may include a system that automatically stops and automatically starts the engine, wherein in a case where a voltage of a battery is lower than a predetermined value at a time when the system automatically starts the engine, the engagement of the clutch may be prohibited before cranking of the engine starts. Such a configuration can suppress the abrasion from being increased by loosing the engaged clutch and sliding the clutch board due to power shortage.

Effects of the Invention

In a control device for a clutch according to the present invention, engagement or disengagement of a clutch is performed before a crankshaft starts rotating, thereby suppressing abrasion of the clutch and maintaining the clutch in a high reliable state.

MODES FOR CARRYING OUT THE INVENTION

In the following, a description will be given of the present invention with reference to drawings.

Figure 1:
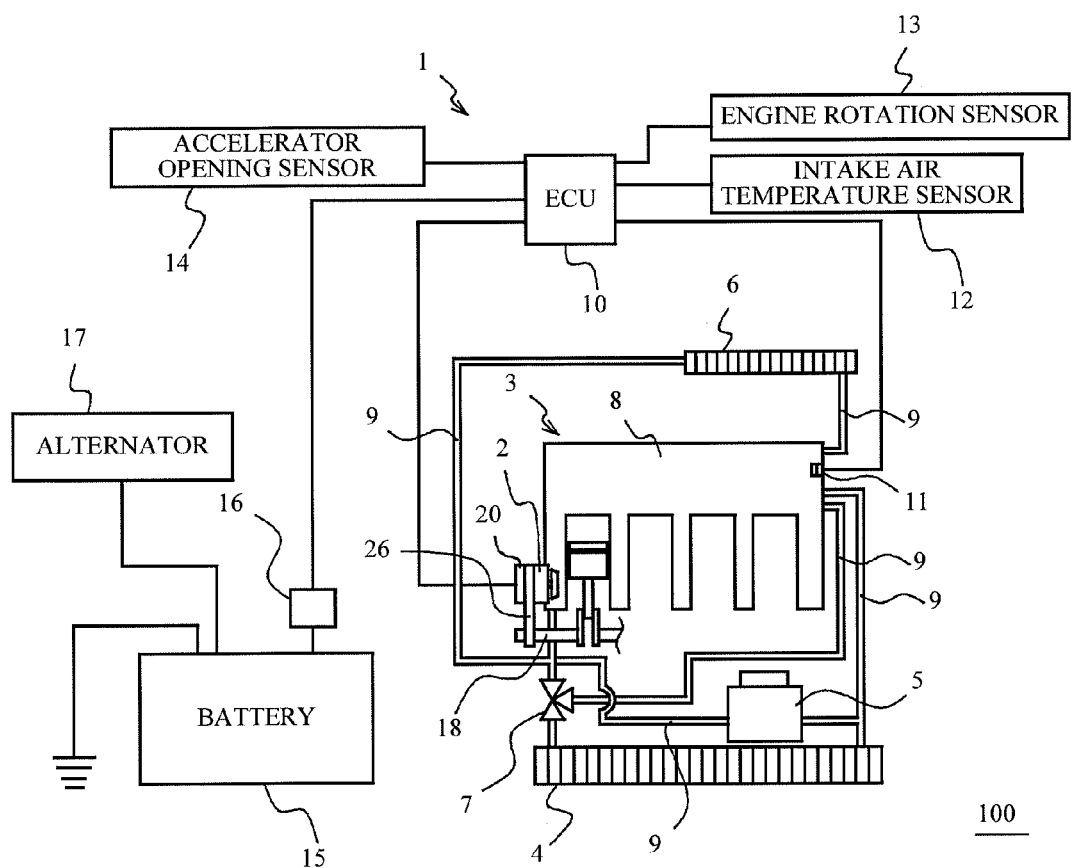
FIG. 1 is a schematic explanatory view of an engine assembled with a control device for a clutch.

FIG. 1 is a schematic explanatory view of an engine 100 assembled with a control device 1 according to the present embodiment. For example, the engine 100 is mounted on a vehicle and is driven. The engine 100 includes an engine main body 3, a radiator 4, a reservoir tank 5, a heater core 6, and a thermostat 7. Within the engine main body 3, a water jacket 8 through which cooling water passes is formed and which is connected to pipes 9 defining a passage such that the cooling water circulates through a water pump 2, the radiator 4, the reservoir tank 5, the heater core 6, the thermostat 7, and the water jacket 8.

The control device 1 is provided with an Electronic Control Unit (ECU) 10. The ECU 10 is a digital computer including a Central Processing Unit (CPU), a Random Access Memory (RAM), a Read Only Memory (ROM), and input/output ports, which are connected to one another through two-way buses. The ECU 10 receives and transmits signals from and to various sensors and operation devices provided for controlling the engine, and controls the engine 100. In this embodiment, the ECU 10 is electrically connected to a water temperature sensor 11 for measuring a water temperature within the water jacket 8, an intake air temperature sensor 12 for measuring an intake air temperature, an engine rotation sensor 13 for measuring a rotational speed of the engine 100, an accelerator opening sensor 14 for measuring an accelerator opening, and a current sensor 16 for measuring an electric current of a battery 15. Also, the battery 15 is electrically connected to an alternator 17. The ECU 10 receives signals from these sensors and obtains several information on the engine 100, and grasps the state of the engine 100. The ECU 10 automatically stops and automatically starts the engine 100 based on the state thereof, that is, the ECU 10 can perform eco-run. Also, the ECU 10 is electrically connected to a coil 27 of the water pump 2 as will be described later. The ECU 10 changes the energization of the water pump 2 based on the state of the engine 100.

The water pump 2 will be explained in detail next. The water pump 2 circulates the cooling water through the passage defined by the water jacket 8 and the pipes 9. The water pump 2 is coupled to the crankshaft 18 of the engine main body 3 via a belt 26, and the rotation of the crankshaft 18 is transmitted to the water pump 2 to drive the water pump 2.

Figure 2:
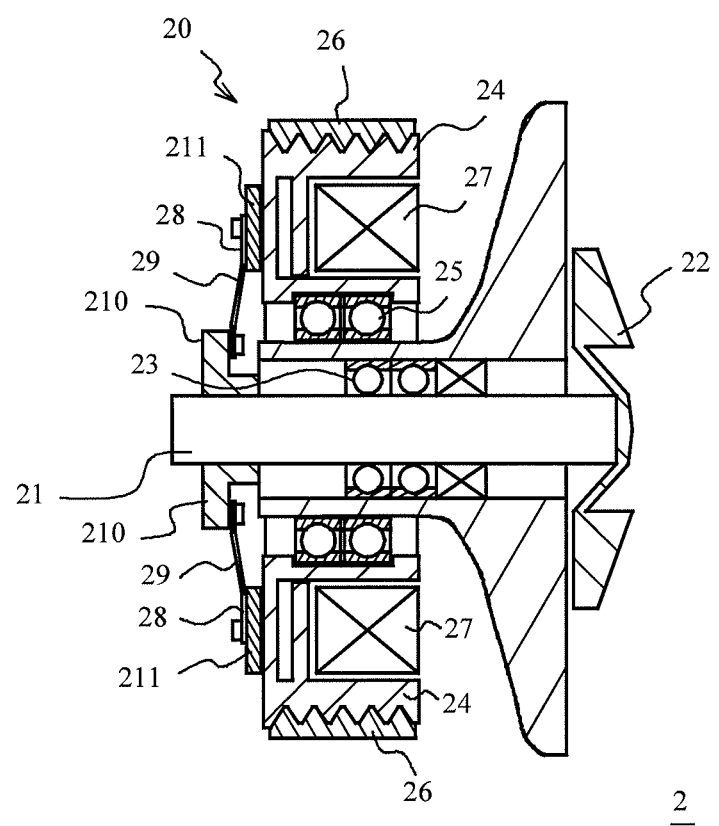
FIG. 2 is a schematic explanatory view of a cross section of a water pump.

FIG. 2 is a schematic explanatory view of a cross section of the water pump 2. The water pump 2 includes a shaft 21, an impeller 22 coupled to one end of the shaft 21, and a clutch unit 20. The shaft 21 is supported by bearings 23. The impeller 22 is located within the water jacket 8. The shaft 21 rotates, so that the impeller 22 rotates, whereby the cooling water flows and circulates through the cooling passage. The clutch unit 20 includes a pulley 24, the coil 27, an armature 28, and a leaf spring 29.

The pulley 24 is arranged at the radially outer circumferential side of the shaft 21. The pulley 24 is supported by bearings 25, and is arranged rotatably about the same axis of the shaft 21. The belt 26 is wound around the radially outer circumferential side of the pulley 24. The rotation of the crankshaft 18 is transmitted into the pulley 24 via this belt 26. Further, the coil 27 is arranged within the pulley 24.

Furthermore, the armature 28 is arranged at a side opposite to the side, of the shaft 21, connected to the impeller 22. The armature 28 is assembled into the shaft 21 through a fixing portion 210 as a part of the shaft 21 and the leaf spring 29, and are arranged such that a distance between the shaft 21 and the armature 28 is substantially equal to a distance between the shaft 21 and the coil 27 arranged within the pulley 24. Further, the pulley 24 side of the armature 28 is fixed with a clutch board 211. Also, the armature 28 is made of materials such as nickel, cobalt, or alloy having ferromagnetism. The ECU 10 energizes the coil 27 to produce a magnetic field, and then the armature 28 is attracted toward the pulley 24 such that the clutch board 211 engages with the pulley 24. When the clutch board 211 engages with the pulley 24 and the crankshaft 18 rotates, the drive force is transmitted to the shaft 21, thereby rotating the shaft 21. The shaft 21 is rotated by receiving the drive force from the crankshaft 18 in such a way, whereby the water pump 2 circulates the cooling water. On the other hand, in order to disengage with the clutch board 211, the energization of the coil 27 is cut. Therefore, the armature 28 is returned to the original position by the biasing force of the leaf spring 29, and then the clutch board 211 moves away from the pulley 24.

The control device 1 having such a configuration switches the clutch unit 20 between the engagement and the disengagement so as to switch the water pump 2 between the drive (water circulation) and the stop (water stop). The ECU 10 determines whether or not to drive the water pump 2, and determines whether to perform the engagement or the disengagement of the clutch unit 20. On the basis of the determination, the clutch unit 20 is switched between the engagement or the disengagement.

Figure 3:
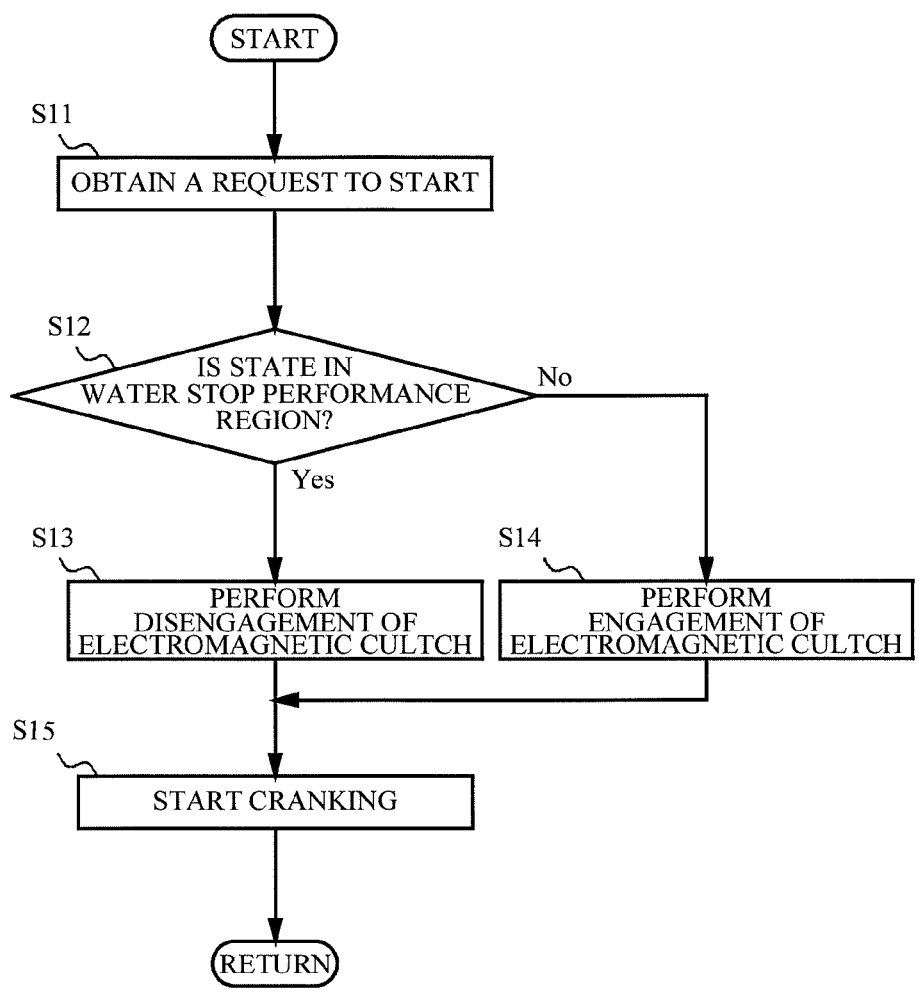
FIG. 3 is a control flow about driving determination of the water pump and switching of a clutch unit.

Next, a description will be given of control of driving determination of the water pump 2 and switching of the clutch unit 20 by the ECU 10. FIG. 3 is a control flow about driving determination of the water pump 2 and switching of the clutch unit 20. This will be described below with reference to the flow illustrated in FIG. 3.

The ECU 10 obtains a request to start the engine 100 in step S11. That is, this control starts based on the request to start the engine 100. After the ECU 10 finishes the process of step S11, the process goes to step S12.

The ECU 10 determines whether or not the state is in the water stop performance region in step S12. It is determined whether or not the state is in the water stop performance region based on the temperature of the engine cooling water. That is, the ECU 10 determines whether to perform the engagement or the disengagement of the clutch unit 20 based on the warming-up state of the engine 100 at the time when the request to start the engine 100 is made. Specifically, when the ECU 10 determines that the temperature of the engine 100 does not reach the temperature where the warming up is finished, the ECU 10 determines that the state is in the water stop performance region.

When the ECU 10 determines YES in step S12, that is, when the ECU 10 determines that the state is in the water stop performance region, the process goes to step S13.

The ECU 10 stops the energization of the coil 27 to perform the disengagement of the clutch unit 20 in step S13. Therefore, even when the cranking of the engine 100 starts and then the crankshaft 18 starts rotating afterward, the water pump 2 is maintained in the stop state. In a case where the water is stopped after the engine 100 starts, the disengagement of the clutch unit 20 is performed in such a way, before the cranking of the engine 100 starts. This reduces the number of engagements of the clutch after the start, thereby suppressing the abrasion of the clutch board 211. When the ECU 10 finishes the process of step S13, the process goes to step S15.

On the other hand, when the ECU 10 determines NO in step S12, that is, when the ECU 10 determines the state is not in the water stop performance region, the process goes to step S14.

The ECU 10 energizes the coil 27 to perform the engagement of the clutch unit 20 in step S14. Therefore, the cranking is performed and the crankshaft 18 starts rotating afterward, so that the rotational force is transmitted to the shaft 21 via the belt 26 to start driving the water pump 2. In a case where the water starts circulating at the same time of the start, the engagement of the clutch unit 20 is performed, before the cranking of the engine 100 starts. When the engagement of the clutch unit 20 is performed after the cranking, the abrasion of the clutch board 211 increases, because there is a rotational difference between the crankshaft 18 and the shaft 21 of the water pump 2. The engagement of the clutch unit 20 is performed before the cranking of the engine 100 starts, thereby suppressing the abrasion of the clutch board 211. When the ECU 10 finishes the process of step S14, the process goes to step S15.

The ECU 10 starts the cranking of the engine 100 in step S15. That is, the engine 100 starts. When the ECU 10 finishes the process of step S15, the process returns.

In the above control, even when the ECU 10 determines that the cooling water circulation is needed and determines that the state is in the water stop performance region in step S12, the ECU 10 performs the engagement of the clutch unit 20 to drive the water pump 2. Such a case of determining that the cooling water circulation is needed is, for example, a case of preventing the cooling water from boiling in the water jacket 8, a case of performing thermosensitive control by the water temperature sensor 11, a case of making a request to start a heater, and a case of leading to the overheating of the engine 100.

Also, when the ECU 10 estimates the abrasion state of the clutch board 211 of the clutch unit 20 and determines that an abrasion amount of the clutch board 211 is larger than a predetermined value, the ECU 10 may prohibit the engagement of the clutch unit 20 and the eco-run in warming-up the engine. For example, when the ECU 10 counts the number of engagements of the clutch unit 20 and the number of engagements of the clutch unit 20 is larger than a predetermined value, the ECU 10 determines that the abrasion amount of the clutch board 211 is lager than a predetermined valve. When the number of engagements of the clutch unit 20 is larger than a predetermined valve, the ECU 10 performs the engagement of the clutch unit 20 before the cranking of the engine 100 starts, and prohibits the water stop during the warming up of the engine 100. In a case of performing the water stop, the engagement of the clutch unit 20 is performed after the water stop is performed, so that the abrasion of the clutch board 211 cannot be prevented from increasing. However, the engagement of the clutch unit 20 is performed to prohibit the water stop before the cranking of the engine 100 starts, thereby suppressing the abrasion of the clutch board 211.

The engagement and the disengagement of the clutch unit 20 are alternately repeated without care, so that the abrasion of the clutch board 211 increases. In a case where the abrasion of the clutch board 211 has increased, the drive force might not be transmitted from the crankshaft 18 to the shaft 21 of the water pump 2, so that the water pump 2 might not be driven. Thus, the engine 100 might overheat. Before the abrasion of the clutch board 211 increases to make it impossible to perform the engagement, the water stop control and the eco-run which lead to the abrasion of the clutch board 211 are prohibited, thereby preventing the engine from overheating. Further, the water stop is prohibited during the warming up, thereby improving preventive effects of the abrasion of the clutch board 211.

In general, the abrasion amount of the clutch board 211 is designed based on the life of the engine 100. However, it is assumed that the number of engagements is larger than the estimated number of times in eco-run where the start and the stop are alternately repeated. The abrasion state of the clutch can be estimated based on the number of engagements. The number of engagements is stored in the ECU 10 to estimate the limit of the abrasion, and the engagement of the clutch and the eco-run caused by the water stop are prohibited.

Figure 4:
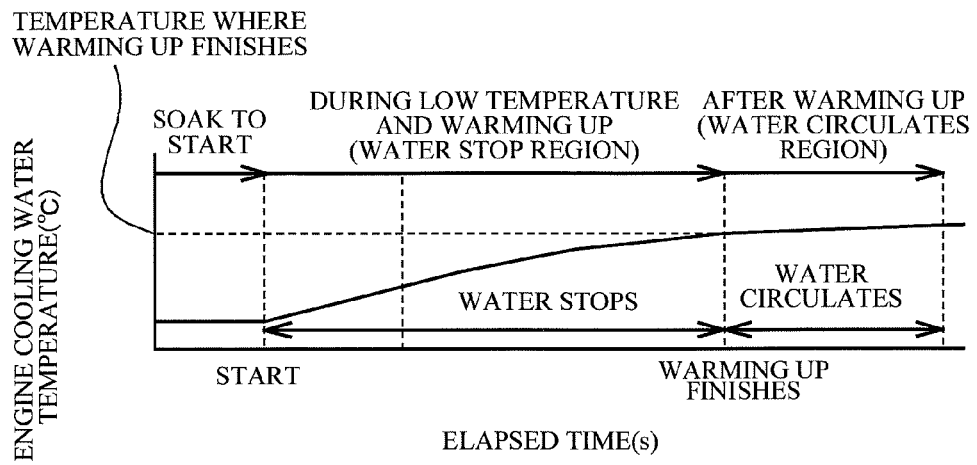
FIG. 4 is an explanatory view of examples of water stop timing and water circulation timing in the engine.
Figure 5:
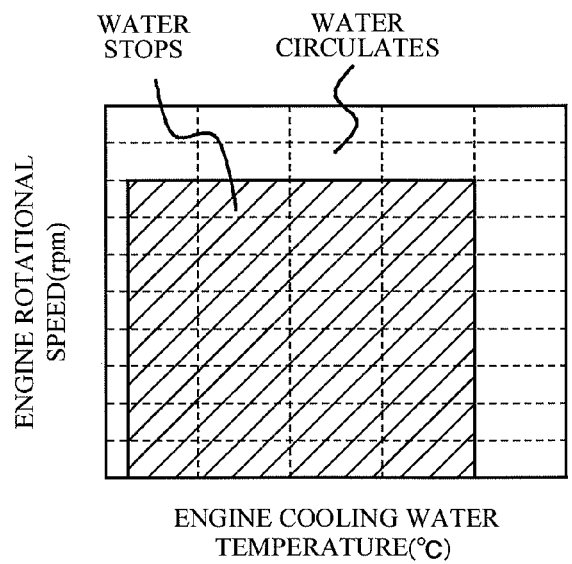
FIG. 5 is an explanatory view of a water stopping performance region after the engine is cranked.

Herein, a description will be given of examples of Water stop timing and water circulation timing in the engine 100. FIG. 4 is an explanatory view of examples of the water stop timing and the water circulation timing in the engine 100. The vertical axis in FIG. 4 indicates a cooling water temperature of the engine 100, and the horizontal axis in FIG. 4 indicates an elapsed time since the engine 100 starts. In FIG. 4, the water stops from the time when the engine 100 starts to the time when the warming up finishes. That is, in the control device 1, the disengagement of the clutch unit 20 is performed before the engine 100 starts (the cranking starts), and the engagement of the clutch unit 20 is performed when the warming up finishes. Additionally, it is determined that the water stop or the water circulation is performed after the engine starts, on the basis of the cooling water temperature, the rotational speed, and the fuel injection amount of the engine 100. FIG. 5 is an explanatory view of the water stop performance region after the engine 100 is cranked. The vertical axis in FIG. 5 indicates an engine rotational speed, and the horizontal axis in FIG. 5 indicates an engine cooling water temperature. When an engine rotational speed value and an engine cooling water temperature value fall within the water stop performance region depicted by oblique lines in FIG. 5, the water stop is performed. That is, the disengagement of the clutch unit 20 is performed. Also, when the fuel injection amount is larger than a predetermined valve, the engine main body 3 might have a high temperature. Thus, even when the engine rotational speed value and the engine cooling water temperature value fall within the water stop performance region, the control device 1 performs the water circulation. The fuel injection amount which is used here is calculated by the ECU 10 on the basis of several information on the engine state such as the engine rotational speed, and an accelerator opening.

As mentioned above, the control device 1 determines the engagement or the disengagement of the clutch unit 20 at the time of making the request to start the engine 100, and switches the state of the clutch unit 20 before the crankshaft 18 starts rotating. Therefore, the abrasion of the clutch board 211 is suppressed, and the water pump 2 is stopped or driven with high reliability.

Figure 6:
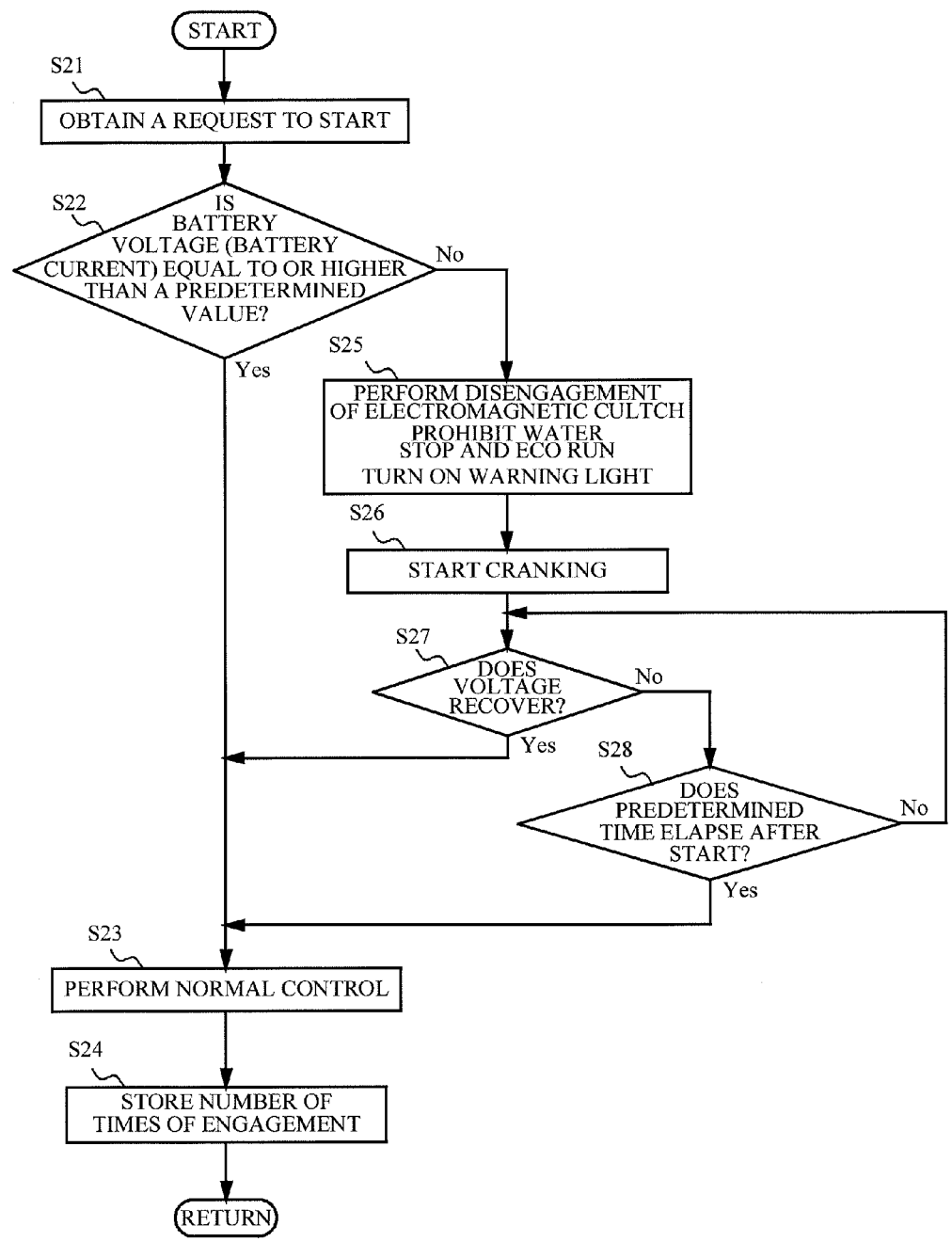
FIG. 6 is a control flow of engagement and disengagement of the clutch unit based on a state of a battery.

Next, a description will be given of another control process of the control device 1 according to the present embodiment. In the present control process, the ECU 10 of the control device 1 determines whether the engagement or the disengagement of the clutch unit 20 is performed based on the state of the battery 15. FIG. 6 is a control flow of the engagement and the disengagement of the clutch unit 20 by the ECU 10 based on the state of the battery 15. A description will be given with reference to the flow in FIG. 6.

The ECU 10 obtains the request to start the engine in step S21. That is, this control starts since the request to start the engine is made. When the ECU 10 finishes the process of step S21, the process goes to step S22.

The ECU 10 determines whether or not the voltage of the battery 15 is equal to or higher than a predetermined value in step S22. Alternatively, the ECU 10 may determine whether or not the current of the battery 15 is equal to or higher than a predetermined value. The voltage of the battery 15 is determined by the current sensor 16. When the voltage of the battery 15 is lower, the current measured by the current sensor 16 is also lower. It is therefore possible to determine a reduction in the voltage of the battery 15 based on values from the current sensor 16. Also, when the battery 15 deteriorates, the voltage of the battery 15 is lower. Likewise, it is therefore possible to determine the deterioration of the battery 15 based on the current sensor 16. Additionally, a voltage sensor may be used instead of the current sensor 16.

When the ECU 10 determines YES in step S22, that is, when the ECU 10 determines that the voltage of the battery 15 is equal to or higher than a predetermined value, the process goes to step S23. In addition, in a case where it is determined based on the current value of the battery 15, when the ECU 10 determines that the current of the battery 15 is equal to or higher than a predetermined value, the process goes to the step S23.

The ECU 10 performs normal control in step S23. Herein, the normal control means the process of steps S12 to S15 in the driving determination of the water pump 2 and the switching control of the clutch unit 20 described above. When the ECU 10 finishes the process of step S23, the process goes to step S24.

The ECU 10 stores the number of engagements of the clutch unit 20 in memory in step S24. The abrasion state of the clutch board 211 can be determined based on the number of engagements. When the ECU 10 finishes the process of step S24, the process returns.

Incidentally, when the ECU 10 determines NO in step S22, that is, when the voltage of the battery 15 is not more than a predetermined value, the process goes to step S25. Additionally, in a case where it is determined based on the current value, when the ECU 10 determines that the current of the battery 15 is not more than a predetermined value, the process goes to step S25.

The ECU 10 performs the disengagement of the clutch unit 20 and the water stop, and prohibits the eco-run in step S25. Further, a warning light arranged on a panel is turned on to inform the driver of the abnormality. In the state where the voltage of the battery 15 is lower, the engagement of the clutch unit 20 might be loose and the clutch board 211 might slide, so that the abrasion might increase. Thus, the disengagement of the clutch unit 20 is performed and the eco-run is stopped. When the ECU 10 finishes the process of step S25, the process goes to step S26.

The ECU 10 starts cranking the engine 100 in step S26. That is, the engine 100 starts. When the ECU 10 finishes the process of step S26, the process goes to step S27.

The ECU 10 determines whether or not the voltage of the battery 15 recovers in step S27. Since the cranking starts in step S26, the alternator 17 might generate power, so that the voltage of the battery 15 may recover. When the ECU 10 determines YES in step S27, that is, when the voltage of the battery 15 recovers, the process goes to step S23.

On the other hand, when the ECU 10 determines NO in step S27, that is, when the voltage of the battery 15 does not recover, the process goes to step S28.

In step S28, the ECU 10 determines whether or not a predetermined time elapses since the engine starts. When a predetermined time elapses after the engine 100 starts, it is assumed that the warming up of the engine 100 continues. For this reason, the process goes to the control for driving the water pump 2 to circulate the cooling water. When the ECU 10 determines YES in step S28, that is, when a predetermined time elapses after the engine 100 starts, the process goes to step S23.

When the ECU 10 determines NO in step S28, that is, when a predetermined time does not elapse after the engine 100 starts, the process goes to step S27 again. That is, when the voltage of the battery 15 has not recovered and a predetermined time does not elapse after the engine 100 starts, the process of step S27 and S28 are repeated.

The above control will be described in detail. When the voltage of the battery 15 is lower and a voltage is applied to the starter of the engine 100 at the time of the start, a large power is consumed. This reduces a current applied to the coil 27. For this reason, the engagement state of the clutch unit 20 cannot be maintained, and then the clutch board 211 might slide on the pulley 24.

Therefore, the abrasion might increase. In such a state where the engagement of the clutch unit 20 cannot be maintained by a decrease in the current applied to the coil 27, it might be difficult to determine whether or not the clutch board 211 slides, and the determination that the abrasion limit of the clutch board 211 might be obstructed. Thus, the abrasion might exceed the abrasion limit, so that the water pump 2 cannot be driven. On the contrary, nevertheless the abrasion has a margin with respect to the abrasion limit, the engagement or the disengagement of the clutch unit 20 might be stopped to degrade the effects of the improved fuel consumption. The present control prevents the clutch board 211 from sliding caused by a reduction in a current applied to the coil 27. This improves the accuracy of the estimation of the abrasion limit of the clutch unit 20, and prevents the water pump 2 from being impossible to be driven. In addition, the warming up and the fuel consumption are improved by stopping the water pump 2.

Also, in the state that the voltage of the battery 15 is lower, the engagement of the clutch unit 20 in starting the engine 100 is canceled. After the engine 100 starts and the alternator 17 generates power, the voltage of the battery 15 recovers. After that, the engagement of the clutch unit 20 is performed. Although the number of engagements increases in this case, there is an advantage to prevent unforeseeable abrasion of the clutch.

Likewise, in a case where the battery 15 might deteriorate, the voltage of the battery 15 is lower. Thus, the disengagement of the clutch board 211 is performed at the time of performing the cranking. After the voltage of the battery 15 is stable, the engagement of the clutch unit 20 is performed. This prevents the unforeseeable abrasion of the clutch board 211.

While the exemplary embodiments of the present invention have been illustrated in detail, the present invention is not limited to the above-mentioned embodiments, and other embodiments, variations and modifications may be made without departing from the scope of the present invention.

In the present embodiment, the electromagnetic clutch has been described. However, for example, another clutch can be controlled in the same manner.

DESCRIPTION OF LETTERS OR NUMERALS

1 control device
2 water pump
20 clutch unit
211 clutch board
3 engine main body
10 ECU
15 battery
18 crankshaft
100 engine

The invention claimed is:

1. A control device for an internal combustion engine for transmitting rotation of a crankshaft of the internal combustion engine automatically stopping and automatically starting to a water pump for circulating cooling water within the internal combustion engine, the control device comprising:
   a determining unit that determines whether engagement or disengagement of a clutch, when a request to start the internal combustion engine is made; and
   a control unit that controls an engagement state of the clutch based on a determination result of the determining unit, before cranking of the internal combustion engine starts.

2. The control device for the internal combustion engine of claim 1, wherein the determining unit determines whether the engagement or the disengagement of the clutch based on a warming-up state of the internal combustion engine at a time of making the request to start the engine.

3. The control device for the internal combustion engine of claim 1, comprising:
   a system that automatically stops and automatically starts the internal combustion engine; and
   a determining unit that determines whether automatic stop and automatic start of the internal combustion engine is permitted or prohibited based on a voltage state of a battery.

4. The control device for the internal combustion engine of claim 1, comprising a system that automatically stops and automatically starts the internal combustion engine,
   wherein in a case where a voltage of a battery is lower than a predetermined value at a time when the system automatically starts the internal combustion engine, the engagement of the clutch is prohibited before cranking of the internal combustion engine starts.

5. The control device for the internal combustion engine of claim 1, comprising an estimating unit that estimates an abrasion state of a clutch board of the clutch,
   wherein the disengagement of the clutch is prohibited, when the estimating unit determines an abrasion amount of the clutch board is equal to or larger than a predetermined value.

6. The control device for the internal combustion engine of claim 5, wherein the disengagement of the clutch is prohibited, when the internal combustion engine is warmed up.

7. The control device for the internal combustion engine of claim 5, wherein the estimating unit estimates the abrasion amount of the clutch based on the number of engagements of the clutch.

8. The control device for the internal combustion engine of claim 1, comprising:
   an estimating unit that estimates an abrasion state of a clutch board of the clutch; and
   a system that automatically stops and automatically starts the internal combustion engine,
   wherein automatic stop and automatic start of the internal combustion engine by the system are prohibited, when the estimating unit determines that the abrasion amount of the clutch board is equal to or larger than a predetermined value.

* * * * *